Sept. 19, 1961     D. J. SIKORRA     3,001,117
SERVOSYSTEM WITH TACH GENERATOR DAMPER
Filed July 22, 1959     2 Sheets-Sheet 1
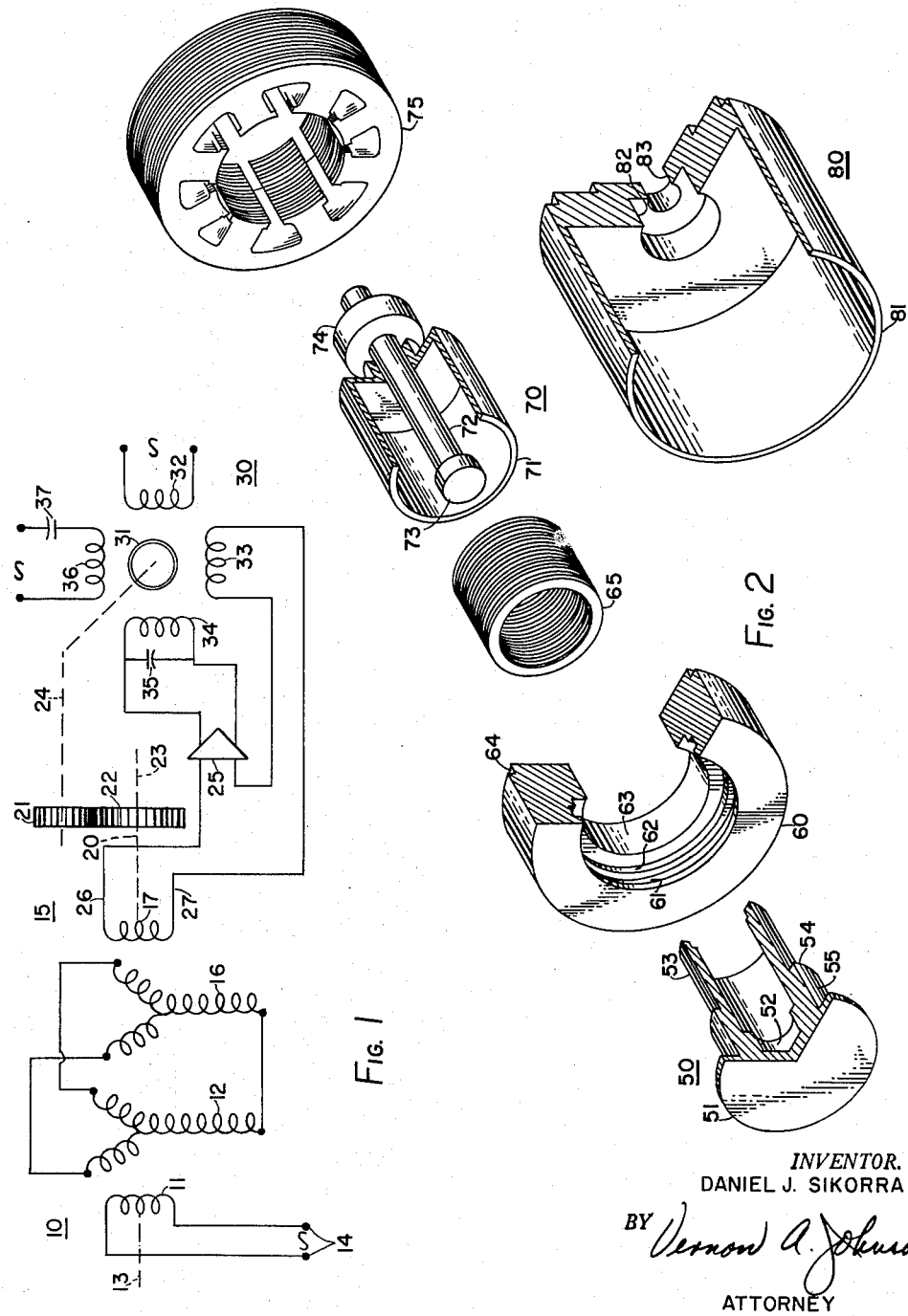
INVENTOR.
DANIEL J. SIKORRA
BY
ATTORNEY Sept. 19, 1961     D. J. SIKORRA     3,001,117

SERVOSYSTEM WITH TACH GENERATOR DAMPER

Filed July 22, 1959     2 Sheets-Sheet 2

*INVENTOR.*
DANIEL J. SIKORRA

BY *Vernon A. Johnson*

ATTORNEY

3,001,117
SERVOSYSTEM WITH TACH GENERATOR DAMPER

Daniel J. Sikorra, Champlin, Minn., assignor to Minneapolis-Honeywell Regulator Company, Minneapolis, Minn., a corporation of Delaware
Filed July 22, 1959, Ser. No. 828,741
8 Claims. (Cl. 318—448)

My invention relates broadly to motor operated means for producing alternating voltages of predetermined wave form, primarily for control purposes, as a function of rotational speed, and more particularly, to apparatus wherein the driven member of the motor and the driving member of the voltage producing means are the same rotational element.

Velocity generators, often referred to as rate or tachometer generators, are well known devices that have extensive applications as components of servomechanisms. A typical use of a velocity generator is found in a position repeater system wherein the velocity or rate signal is used to achieve rate damping. In order for such a system to perform accurately, it is essential that there be practically no residual generator signal at any rotational position where the rotor may stop, and it is also essential that an accurate low-speed velocity signal be generated that is proportional to rotational speed. These essentials have been achieved in the past by using a separate motor to drive a drag-cup velocity generator of the type shown in Riggs Patent 2,206,920. However, this configuration does not lend itself well to miniaturization, and the combined unit is comparatively heavy, since separate laminations are used for each device.

My invention discloses a combined motor and velocity-generator, wherein a single conductive rotor is the driven member of a motor, and the driving member of a velocity generator. By using the winding configuration that I describe, it is possible to achieve both of these functions from a very compact unit, wherein the same core and stator laminations are used to support the motor and velocity-generator windings. In addition, the use of a conductive rotor as I have shown, makes it possible to achieve accurately proportional generator outputs for low rotational speeds of the rotor, with a zero generator output at any position where the rotor stops.

Thus, it is a primary object of my invention to provide an improved apparatus for electrical control wherein a single rotating element is the driven member of a motor and the driving member of a velocity generator.

A further object of the invention is to provide such a device in an inexpensive and lightweight configuration with the motor and velocity generator windings arranged about the same magnetic structure.

These and other objects of my invention will become apparent form the following description of a preferred form thereof and the two sheets of drawings illustrating that form, in which:

FIGURE 1 is a schematic diagram of a typical application of my invention;

FIGURE 2 is an exploded view of my invention, with portions of various items cut away to provide a more detailed view;

Figure 4:
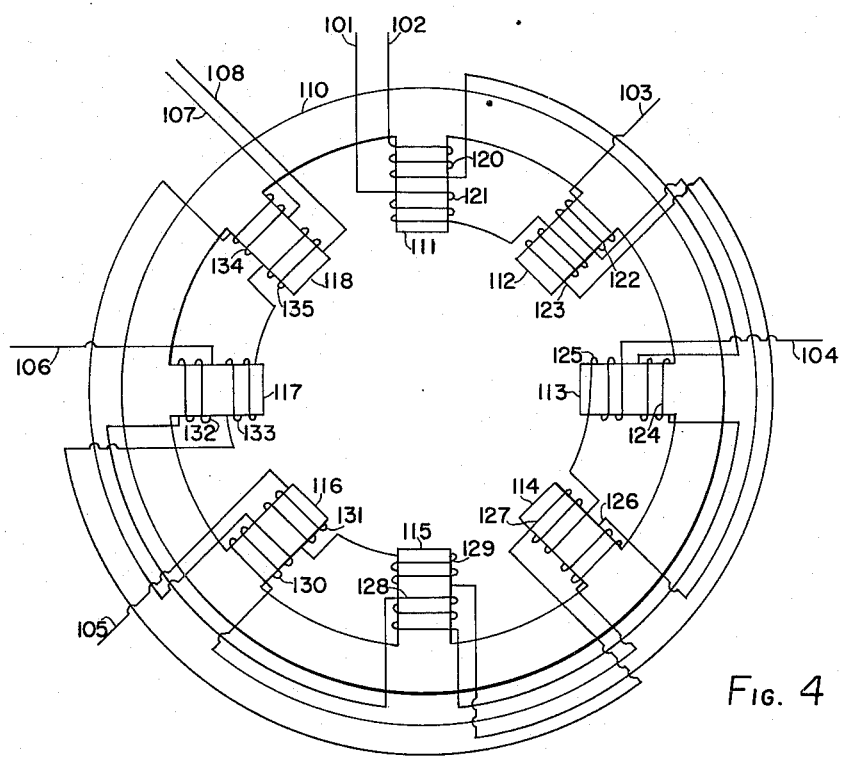
FIGURE 4 is a schematic diagram of a typical winding configuration for my invention.

In FIGURE 1, I have shown a conventional position repeater system wherein synchro-transmitter 10 consists of primary winding 11 and Y connected secondary winding 12, and a synchro control transformer 15 consists of a Y connected primary winding 16 and a secondary winding 17. Primary winding 11 of synchro-transmitter 10 is connected by means of mechanical linkage 13 to a suitable control means (not shown) which may be either manual or automatic; and is connected by leads 14 to a source of alternating voltage (not shown). Secondary winding 17 of synchro control transformer 15 is rotatably controlled by mechanical linkage 20 and gear 22, gear 22 being in turn driven by a smaller gear 21 which is connected by a mechanical linkage 24 to the rotor 31 of my motor velocity generator 30. Gear 22 is also connected by means of mechanical linkage 23 to a suitable load (not shown) such as a resolver, function generator potentiometer, or switch.

As is well known in the art, secondary winding 17 of synchro control transformer 15 provides a single voltage across leads 26 and 27 which has a magnitude proportional to the sine of the angular difference, or displacement error, between the rotor shaft that supports primary winding 11 and the rotor shaft the supports secondary winding 17, and a phase corresponding to the relative direction of said angular difference. Thus, the voltage across winding 17, which is often referred to as an error signal, is an accurate indication of the position of primary winding 11, and is therefore an effective source of information for the position repeater system of FIGURE 1. It should be remembered that although synchrotransmitter 10 and synchro control transformer 15 are shown in relatively close proximity on FIGURE 1, these units are normally remotely located from each other, and are merely used to transmit the necessary positional information to that portion of the system shown at the right of the synchro control transformer 15.

Subtracted from the error signal is a voltage from the A.C. rate generator, whose phase is adjusted to be exactly the same as that of said error signal. This generator signal is developed in output winding 33 of my motor velocity generator 30, the phase of this signal being controlled by the fixed-phase alternating current applied to generator winding 32, and by the direction of rotation of rotor 31, as will be explained in greater detail below.

Rotor 31 is driven as the rotor of a motor by fixed-phase winding 36 and control-phase winding 34, arranged in a conventional two phase, four pole, variable speed induction motor configuration. Winding 36 is excited through capacitor 37, from the same alternating current source (not shown) that controls windings 32 and 11. Winding 34 is excited in parallel with capacitor 35 by the alternating current output signal of amplifier 25. The phase and magnitude of this amplifier output signal are controlled by the above described error signal winding 17. The signals supplied to windings 36 and 34 are caused to be in phase quadrature by capacitors 35 and 37, and the distribution of these windings around rotor 31 is such that these quadrature-phased signals generate a rotating magnetic field which, in turn, causes rotation of rotor 31, all in the well-known manner.

During operation, the position repeater system of FIGURE 1 is operative to rotate secondary winding 17 in a direction to reduce the above described error signal, until the desired null condition is achieved. For example, rotation of coil 11 by means of mechanical linkage 13 causes a voltage to be transmitted through secondary winding 17 to the input of amplifier 25. The amplified signal is then effective in the control winding 34 of the motor portion of my motor velocity generator to rotate rotor 31, thereby turning gears 21 and 22. As rotor 31 is rotated, a signal is generated in generator output winding 33 which tends to damp the operation of the system. Gear 22 is thereby rotated until coil 17 has been rotated through the same angular displacement as primary winding 11, at which time the signal in coil 17 becomes reduced to zero, rotor 31 stops rotating due to an absence of excitation in control winding 34, and the rate signal in winding 33 goes to zero. Since the velocity generator winding 33 tends to build up a signal to damp the operation of the motor portion of my device, thereby acting much like a viscous damper, there is negligible overshoot caused by continued rotation of the rotor after the desired position is reached, resulting in very precise movement to the desired position. It should, of course, be remembered that as gear 22 is rotated, the load coupled to the gear by means of linkage 23 is also rotated so as to perform its function.

Figure 3:
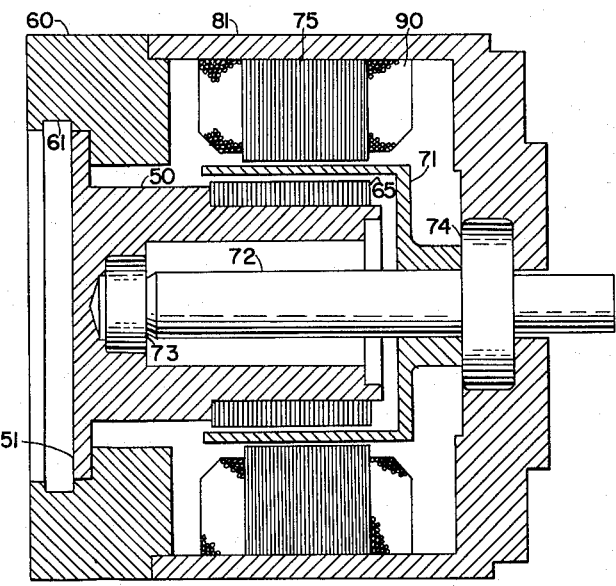
FIGURE 3 is an enlarged sectional view of my assembled device.

In FIGURES 2 and 3, I have shown the basic construction of my device, an exploded view being shown in FIGURE 2 and an assembled view in FIGURE 3. The same identifying numbers have been used for both views. Plug 50 supports core 65 and bearing 73. Shoulder 51 of plug 50 has an outside diameter equal to the inside diameter of shoulder 62 of motor end bell 60, and an axial length equal to that of shoulder 62. Thus, in the assembled unit, shoulder 51 fits inside of shoulder 62, and against shoulder 63 of motor end bell 60. A snap ring (not shown) is then seated in groove 61 to hold the plug in place. Opening 52 in plug 50 is provided to receive bearing 73, and surface 53 is machined to have an outside diameter approximately equal to the inside diameter of inner magnetic core 65 so that the laminations forming core 65 fit on plug 50 with a snug fit. Core 65 is preferably held in place on plug 50 by being forced against shoulder 54 of surface 55, with the outer end of surface 53 spun over and against the end lamination.

Motor end bell 60 is provided with a groove 64 around the outer edge as shown, to receive the end of surface 81 of case 80.

Rotor assembly 70 consists of a shaft 72 with bearings 73 and 74 mounted at either end as shown, a non magnetic and conductive thin-walled drag-cup type rotor 71 being mounted securely to shaft 72 near bearing 74 by any suitable means.

The outer magnetic core, or stator, 75, consists of a series of laminations that are illustrated to include eight salient poles. Although no windings are shown, it should be understood that generator and motor windings would ordinarily be placed on these salient poles in integral relation, to thereby form a complete stator assembly. It should be understood that a stator having a series of slots could be used, with the windings distributed around said stator in the conventional manner, or that the windings could be symmetrically wound on the core member rather than the stator, without effecting the basic operation of my device. The laminations of the stator 75 have an outside diameter approximately equal to the inside diameter 81 of case 80, and therefore engage said surface with a snug fit; and an inside diameter larger than the outside diameter of core 65, whereby an air gap exists between these elements when they are properly assembled in complementary, concentric relation.

The outer case, or housing, 80, functions as an end bell for my motor velocity generator, as a bearing support for bearing 74, and as a support for stator 75. Bearing 74 fits snugly into opening 82, and opening 83 has a diameter slightly larger than shaft 72 so that shaft 72 is free to rotate therein. Although no spacing devices are shown for holding stator 75 in its proper axial position, and no motor bolts are shown for assembling the device, it should be understood that such devices would ordinarily be provided.

In FIGURE 4, I have shown a typical winding configuration for my device, whereby I achieve four electrical poles for the motor, and two electrical poles for the velocity generator, the windings being distributed over the eight pole pieces as shown.

Leads 102 and 106, and coils 120, 124, 128, and 132, form the motor control winding of the device, being thereby equivalent to schematically shown winding 34 in FIGURE 1. Leads 103 and 107, and coils 122, 126, 130, and 134 form the fixed phase winding of the motor, being thereby equivalent to schematically shown winding 36 in FIGURE 1. Leads 101 and 105, and windings 121, 123, 129, and 131, form the fixed phase winding of the velocity generator portion of the device, being thereby equivalent to schematically shown winding 32 in FIGURE 1. Leads 104 and 108, and windings 125, 127, 133 and 135, form the output winding of the velocity generator portion of the device, being thereby equivalent to schematically shown winding 33 in FIGURE 1. These windings are symmetrically placed on stator 110, which includes pole pieces 111 through 118, so as to maintain independent motor and velocity generator operations, in the manner that will now be described.

In order to analyze this arrangement, it is necessary to select an arbitrary point in time, and compare the flux paths that are involved. I will first assume that current is flowing into lead 107 of the motor fixed phase winding and out of lead 103. It follows, therefore, that current is flowing into lead 105 of the velocity generator fixed phase winding and out of lead 101, since both of the fixed phase windings are connected to the same energizing source. If, at the same time, the output of amplifier 25 is such as to cause current flow into lead 106 of the motor control winding and out of lead 102, the direction of rotation of rotor 31 is such as to cause current flow into lead 108 of the velocity generator output winding and out of lead 104. If the signal from the amplifier 25 was such as to cause rotation in the opposite direction, the current would, at this instant of time, flow into leads 102 and 104, the phasing of these two windings being controlled by the circuit including amplifier 25.

The theory involved in the production of current flow in the velocity generator output winding is well understood in the art, and discussed in the above mentioned Riggs patent, and no effort will be made to provide a detailed discussion herein. It should suffice to point out that rotation of the conductive rotor in the magnetic field produced by excitation of the other windings, causes voltage to be produced in the rotor that is inductively conveyed from the rotor to the velocity generator output winding. However, in order to avoid production of a signal in the velocity generator output winding responsive to excitation of the motor windings, it is essential to arrange the windings so that effects of motor excitation are cancelled in the velocity generator output winding. This is accomplished by providing a different number of motor and velocity generator poles. In the preferred embodiment of my invention, a four pole motor and a two pole velocity generator are used. Thus, under the assumed conditions stated above, the following flux relationships prevail: The current in the motor fixed phase winding causes flux to flow out of pole pieces 112 and 116, and into pole pieces 114 and 118; the velocity generator fixed phase winding causes flux to flow out of pole pieces 111 and 112 and into pole pieces 115 and 116. the motor control phase winding causes flux to flow out of pole pieces 111 and 115, and into pole pieces 113 and 117, and the resultant flux causing current to flow in the velocity generator output winding flows out of pole pieces 117 and 118, and into pole pieces 113 and 114. It is apparent, then, that where the motor and velocity generator flux are added in one pole piece, they are subtracted in a different pole piece in the configuration, so that the net effect of one upon the other is zero. For example, it should be noted that motor control phase and velocity generator fixed phase flux is additive in pole piece 111, but subtracted in pole piece 115, due to the symmetry of the circuit and stator configuration, so that there is a resultant absence of inter action between these two windings. A similar comparison could be made at any other point in the system, and would hold for motor reversal, and for a point in time one half cycle later which would cause a reversal of the assumed current flow.

It is therefore apparent that my winding configuration, and the symmetrical stator design, result in separate motor and velocity generator functions, although the same rotor is used to achieve both functions.

Another problem involved in a device of this type, and particularly, a device intended for servo control such as the position repeating system described above, is the provision of an accurate rate signal that approaches zero at any static rotary position of the rotor. This requires exact symmetry of the magnetic reluctance throughout the assembly, at all positions of the rotor. A conventional rotor, such as the commonly used squirrel-cage rotor, is unsuitable for this purpose, since the magnetic reluctance of the material in the rotor is not constant throughout the rotor, whereby errors are introduced in the desired null-point accuracy. The structure that I have used effectively overcomes this problem, since all of the magnetic elements are maintained in fixed relation, whereby the magnetic properties of the device can be symmetrically balanced during assembly of the device, and the angular position of the conductive, non-magnetic rotor does not upset this balance.

It will of course be readily understood by anyone skilled in the art, that the principles of my invention could be readily applied to a conductive rotor type motor having an axial air gap structure, rather than the radial air gap structure shown and described herein.

What has been described is considered to be the preferred embodiment of my invention, but it is apparent that numerous modifications thereof are possible. Therefore, I do not wish to be limited to the form shown except as indicated in the following claims.

What I claim is:

1. A position following system, comprising: means for producing a first signal proportional to a positional error; a signalling device including a case, a stator and a core carried by said case and having complementary cylindrical adjacent surfaces defining an air gap therebetween, a shaft rotatably carried by said case, a cup-shaped rotor carried by said shaft and provided with a cylindrical portion rotatably positioned in said air gap, a pair of motor windings symmetrically wound on said stator, and a pair of generator windings symmetrically wound on said stator in integral relation with said motor windings; means for energizing one motor winding and one generator winding with a fixed alternating current; error changing means connected to said shaft for changing said positional error; first circuit means connected to energize the other motor winding with a variable alternating current proportional to said first signal and thereby, responsive to said fixed alternating current in said one motor winding and variable alternating current in said other motor winding, create a rotating magnetic field in said signalling device and drive said motor and shaft in a direction to cause said error changing means to reduce said positional error and said first signal, the second generator winding being effective, responsive to said fixed alternating current in said one generator winding, to produce a second signal proportional to the rotational rate of said rotor and independent of said rotating magnetic field, whereby said second signal is reduced to zero as said rotor assumes a static position; and second circuit means for differentially combining said first and second signals whereby said second signal is effective to provide rate damping in said system and thereby prevent overcorrection of said positional error.

2. A signal generating device comprising: a stator member having a circular opening therein; a core member having a peripheral surface of substantially circular design, the outer diameter of said core member being less than the diameter of said opening; means for mounting said core member in said opening so as to define an air gap therebetween, and for completing a magnetic circuit therebetween; a tubular non-magnetic, conductive rotor; means for rotatably mounting said rotor in said air gap; a first pair of windings symmetrically wound on said stator member, excitation of said windings with quadrature phased alternating currents being effective to create a rotating magnetic field and thereby drive said rotor; and a second pair of windings symmetrically wound on said stator, one of said second pair of windings being effective responsive to excitation of the other of said second pair of windings with a fixed alternating current, to generate a signal that is precisely proportional to the rotational velocity of said rotor and independent of said rotating magnetic field.

3. A signal generating device, comprising; a housing; a stator carried by said housing and consisting of a plurality of first laminations; an end bell carried by said housing; a core member carried by said end bell, and comprising a plurality of second laminations, said stator and core member having complimentary cylindrical adjacent surfaces forming an air gap therebetween; a rotatably mounted cylindrical and conductive rotor located in said air gap; a first pair of windings symmetrically wound on said stator, and effective when excited by quadrature phased alternating currents to create a rotating magnetic field and thereby drive said rotor; and a second pair of windings symmetrically wound on said stator, excitation of one of said second pair of windings with a fixed alternating current being effective to generate a signal in the other of said pair of windings proportional to the rotational velocity of said rotor and independent of said rotating magnetic field.

4. A signal generating device comprising: a case; a shaft rotatably carried by said case, said shaft having an output portion; a pair of laminated core members carried by said case, said members having complementary cylindrical surfaces located in concentric relation about the axis of said shaft so as to define an air gap therebetween; a cylindrical, conductive rotor carried by said shaft, and positioned thereby for rotation within said air gap; a pair of motor windings symmetrically wound on one of said core members, and effective when excited by quadrature phased alternating currents to create a rotating magnetic field and thereby drive said rotor and shaft; and a pair of generator windings symmetrically wound on said one core member, one of said generator windings being effective responsive to excitation of the other of said generator windings with alternating current, to provide an output signal proportional to the rotational velocity of said rotor and independent of said rotating magnetic field, said output signal being reduced to zero at any fixed rotational position of said rotor.

5. A signal generator as claimed in claim 5, wherein said motor windings are wound in a four-pole configuration, and said generator windings are wound in a two-pole configuration.

6. A signal generator as claimed in claim 4, wherein said one core member is formed with eight salient poles symmetrically located therearound, one of said motor windings wound on four of said poles located at ninety degrees intervals, the other motor winding wound on the other four of said poles, said one generator winding wound on two adjacent ones of said poles and on the two adjacent salient poles diametrically opposite said first mentioned adjacent poles, and said other generator winding wound on the four salient poles other than said adjacent poles, said windings being placed on said poles such that the signals induced in a particular generator winding at any of said poles as a result of signals in said motor windings, are cancelled by equal and opposite signals induced in said particular generator winding at other of said poles.

7. A signal generating device comprising: a case; a shaft rotatably carried by said case, said shaft having an output portion; a laminated core carried by said case; a conductive rotor carried by said shaft and positioned thereby for rotation adjacent said core; a pair of motor windings symmetrically wound on said core and effective when excited by quadrature phased alternating currents to create a rotating magnetic field and thereby drive said rotor and shaft; and a pair of generator windings symmetrically wound on said core in integral relation with said motor windings, one of said generator windings being effective responsive to excitation of the other of said generator windings with alternating current to provide an output signal proportional to the rotational velocity of said rotor and independent of said rotating magnetic field.

8. A signal generating device, comprising: a housing provided with a large opening at one end and a smaller opening at the other end; a core and bearing support member carried by said housing and positioned to close said large opening; a shaft mounted to rotate about an axis through the center thereof by a first bearing carried by said support member and a second bearing carried by said housing, a portion of said shaft extending through said smaller opening to the outside of said housing; a laminated stator carried by said housing; a laminated core carried by said support member, said stator and core having complementary cylindrical adjacent surfaces forming an air-gap therebetween; a cup-shaped conductive rotor carried by said shaft, and formed with a thin-walled cylindrical portion rotatably located in said air gap; a pair of motor windings symmetrically wound on said stator and effective when excited by quadrature phased alternating currents to create a rotating magnetic field and thereby drive said rotor shaft to provide a mechanical output; and a pair of generator windings symmetrically wound on said stator, one of said generator windings effective to provide an electrical output signal proportional to the rotational speed of said rotor and shaft and independent of said magnetic field, responsive to excitation of the other generator winding with an alternating current signal.

References Cited in the file of this patent

UNITED STATES PATENTS

| | | |
|---|---|---|
| 2,802,160 | Engeler | Aug. 6, 1957 |
| 2,898,486 | Sheldon | Aug. 4, 1959 |

OTHER REFERENCES

Ahrendt, W. R.: Servomechanism Practice, first ed., FIGS. 8–3, p. 117, McGraw-Hill, N.Y., 1954.